(12) United States Patent
Gage (10) Patent No.: US 9,559,505 B2
(45) Date of Patent: Jan. 31, 2017

(54) MULTI-GANG FACEPLATE ASSEMBLY FOR LOAD CONTROL DEVICES

(71) Applicant: Lutron Electronics Co., Inc., Coopersburg, PA (US)

(72) Inventor: Alexander Wade Gage, Havertown, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

(21) Appl. No.: 14/796,705

(22) Filed: Jul. 10, 2015

(65) Prior Publication Data

US 2016/0013626 A1    Jan. 14, 2016

Related U.S. Application Data

(60) Provisional application No. 62/023,323, filed on Jul. 11, 2014.

(51) Int. Cl.
*H02G 3/14* (2006.01)
*H02G 3/08* (2006.01)
*H02G 3/12* (2006.01)
*H02G 3/10* (2006.01)

(52) U.S. Cl.
CPC ............... *H02G 3/14* (2013.01); *H02G 3/081* (2013.01); *H02G 3/10* (2013.01); *H02G 3/12* (2013.01); *H02G 3/083* (2013.01)

(58) Field of Classification Search
CPC ............ H02G 3/14; H02G 3/083; H02G 3/12; H05K 5/0217; H05K 5/03
USPC ....... 174/66, 67, 486, 488, 502, 481, 53, 55; 220/241, 242, 3.2, 3.3, 3.5, 3.6, 3.7, 3.8, 220/3.9, 3.92, 3.94
See application file for complete search history.

(56) References Cited

U.S. PATENT DOCUMENTS

| | | | | |
|---|---|---|---|---|
| 4,247,738 A * | 1/1981 | Bonato | ................ | H02G 3/121 174/53 |
| 4,733,330 A * | 3/1988 | Tanaka | ................ | H02G 3/121 174/58 |
| 4,833,277 A | 5/1989 | Jacoby, Jr. et al. | | |
| 4,835,343 A | 5/1989 | Graef et al. | | |
| 4,924,349 A | 5/1990 | Buehler et al. | | |
| 5,455,388 A * | 10/1995 | Pratt | ................ | H02G 3/185 174/67 |
| 5,744,750 A * | 4/1998 | Almond | ................ | H02G 3/185 174/541 |
| 7,579,566 B2 | 8/2009 | Sloan et al. | | |

(Continued)

*Primary Examiner* — Dimary Lopez Cruz
(74) *Attorney, Agent, or Firm* — Condo Roccia Koptiw LLP (57) ABSTRACT

A faceplate assembly for a wall-mounted electrical device may include a faceplate, an adapter plate, and/or an insert element. The faceplate assembly may be configured to accept a wall-mounted electrical device. The adapter plate may be configured to be attached to a wall-mounted electrical device. The adapter plate may include an opening that permits a front surface of a portion of the wall-mounted electrical device to protrude through the adapter plate. The faceplate may be configured to be removably attached to the adapter plate. The faceplate may include an opening that permits the front surface of the portion of the wall-mounted electrical device to protrude through the faceplate. The insert element may be configured to be removably attached to the adapter plate. The insert element may be configured to occupy a peripheral gap between an inner edge of the adapter plate and the outer surface of the wall-mounted electrical device.

25 Claims, 11 Drawing Sheets

(56) References Cited

U.S. PATENT DOCUMENTS

| | | | |
|---|---|---|---|
| 8,314,334 B1* | 11/2012 | Cleghorn | H02G 3/14 |
| | | | 174/66 |
| 8,420,956 B2* | 4/2013 | Alderson | H02G 3/12 |
| | | | 174/480 |
| 8,497,424 B2* | 7/2013 | Castaldo | H02G 3/081 |
| | | | 174/50 |
| 8,710,763 B2 | 4/2014 | Hakkarainen et al. | |
| 2007/0272532 A1 | 11/2007 | Pessina et al. | |
| 2009/0071681 A1* | 3/2009 | Junjie | H02G 3/088 |
| | | | 174/66 |
| 2014/0224792 A1* | 8/2014 | Beneke | H02G 3/123 |
| | | | 220/3.3 |

* cited by examiner

MULTI-GANG FACEPLATE ASSEMBLY FOR LOAD CONTROL DEVICES

CROSS-REFERENCE TO RELATED APPLICATIONS

This application claims priority to U.S. provisional patent application No. 62/023,323, filed Jul. 11, 2014, which is incorporated herein by reference in its entirety.

BACKGROUND

Wall-mounted electrical devices may be installed together in a multi-gang electrical wallbox with a single multi-gang faceplate (e.g., wall plate) installed over the wall-mounted electrical devices. Such wall-mounted electrical devices may include front surfaces that are adapted to be received through standard-sized openings of a multi-gang faceplate (e.g., traditional-style or designer-style openings). When the electrical devices have front surfaces that are adapted to be received through the same standard-sized opening, an "off-the-shelf" multi-gang faceplate may be purchased for the installation. When the electrical devices have front surfaces that are not all adapted to be received through the same standard-sized opening, a custom (e.g., a special order) multi-gang faceplate may be required.

Some prior art faceplate assemblies have comprised two pieces: a front "screw-less" faceplate and an adapter plate to which the screw-less faceplate is mounted. For example, the adapter plate may be mounted to one or more electrical devices (e.g., using faceplate screws) and the screw-less faceplate may be snapped to the adapter plate. The screw-less faceplate provides a clean aesthetic appearance since there are no screw holes in the front surface of the faceplate. An example of a two-piece faceplate assembly is described in greater detail in commonly-assigned U.S. Pat. No. 4,835,343, issued May 30, 1989, entitled TWO PIECE FACE PLATE FOR WALL BOX MOUNTED DEVICE, the entire disclosure of which is hereby incorporated by reference.

SUMMARY

A faceplate assembly for a wall-mounted electrical device may comprise a faceplate, an adapter plate, and/or an insert element. The faceplate assembly may be configured to accept a plurality of wall-mounted electrical devices. The faceplate assembly may include an insert element. The adapter plate may be configured to be attached to a wall-mounted electrical device. The adapter plate may define a first opening. The first opening may be configured to permit a front surface of a portion of the wall-mounted electrical device to protrude through the adapter plate. The adapter plate may comprise a rear surface. The rear surface of the adapter plate may comprise a cavity. The cavity may surround the first opening. The adapter plate may be configured to align the wall-mounted electrical device within the first opening.

The faceplate may be configured to be removably attached to the adapter plate. The faceplate may define a second opening. The second opening may be configured to permit the front surface of the portion of the wall-mounted electrical device to protrude through the faceplate.

The insert element may be configured to be removably attached to the adapter plate. The insert element may comprise a flange. The flange of the insert element may be configured to be accepted by the cavity of the adapter plate. The insert element may define a third opening. The third opening may be configured to permit the front surface of the portion of the wall-mounted electrical device may protrude through the insert element. The insert element may be configured to occupy a peripheral gap between an inner edge of the adapter plate and on outer surface of the portion of the wall-mounted electrical device. The insert element may be configured to adjust a distance that the front surface of the portion of the wall-mounted electrical device extends beyond the front surface of the faceplate. The insert element may be configured such that, when installed, the front surface of the portion of the wall-mounted electrical device is substantially flush with the front surface of the faceplate.

The insert element may be secured to the adapter plate. The adapter plate may be configured to prevent removal of the insert element via a front surface of the adapter plate. The front surface of the adapter plate may be proximate to the faceplate. The adapter plate may include a plurality of first snaps surrounding the first opening. The insert element may include a plurality of second snaps surrounding a periphery of the insert element. The plurality of second snaps of the insert element may be configured to be demountably engaged with the plurality of first snaps of the adapter plate to secure the insert element to the adapter plate. The plurality of first and second snaps may be configured to hinder the removal of the insert element, when the insert element is secured to the adapter plate. The plurality of first and second snaps may comprise sloped surfaces.

The first opening of the adapter plate may permit a first portion of the wall-mounted electrical device to protrude through the adapter plate. The second opening of the faceplate may permit a second portion of the wall-mounted electrical device to protrude through the faceplate. The first portion may comprise the second portion. The third opening of the insert element may permit the second portion of the wall-mounted electrical device to protrude through the insert element.

DETAILED DESCRIPTION

Figure 1:
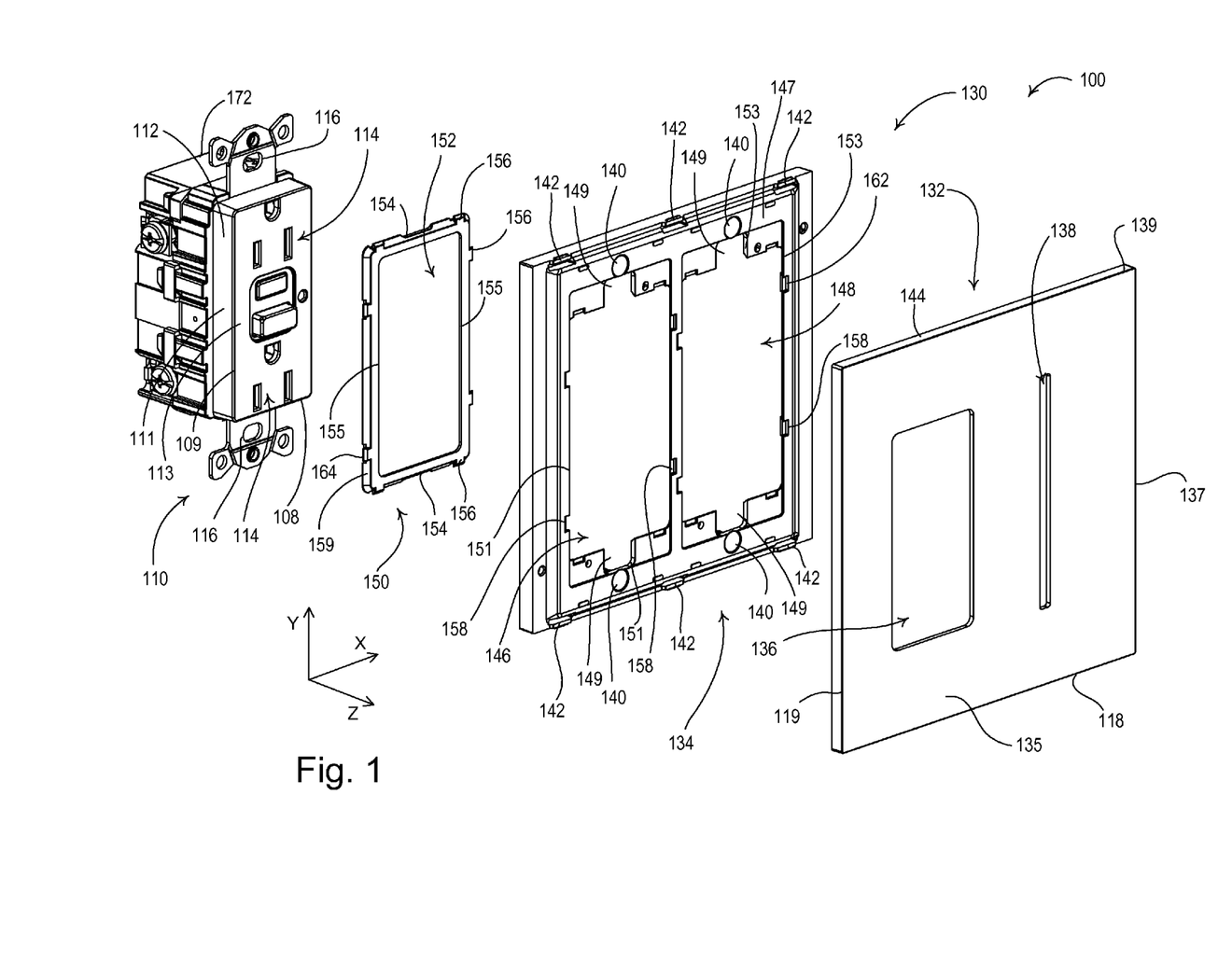
FIG. 1 is a partially exploded isometric view of a multi-gang installation that comprises an example faceplate assembly.

FIG. 1 is a partially exploded isometric view of a multi-gang installation 100 that comprises an example faceplate assembly 130. The multi-gang installation 100 may comprise the faceplate assembly 130 and one or more (e.g., a plurality) of wall-mounted electrical devices. The plurality of wall-mounted electrical devices may comprise any number and/or any combination of an electrical outlet, a load control device (e.g., a dimmer switch), and/or the like.

An example electrical outlet 110 is illustrated in FIG. 1, FIG. 8, and FIGS. 9A-9B. The electrical outlet 110 may be adapted to be electrically coupled to an alternating-current (AC) power source (not shown). The electrical outlet 110 may comprise a portion 112 that may define, for example, a bezel, a protrusion, a front housing, and/or a user interface of the electrical outlet. As shown in FIG. 1, FIG. 8, and FIGS. 9A-9B, the portion 112 may define a front housing of the electrical outlet 110. The portion 112 may comprise an outer surface 111. One or more electrical receptacles 114 may be arranged on a front surface 113 of the portion 112. The one or more electrical receptacles 114 may be configured to accept a plug-in electrical load, such that the plug-in electrical load may be powered from the AC power source. The electrical outlet 110 may comprise one or more yokes 116, which for example, may be located along the top and bottom surface of the electrical outlet 110. The one or more yokes 116 of the electrical outlet 110 may be configured to accept a wallbox screw 168 for securing the electrical outlet 110 to a wallbox (not shown). The electrical outlet 110 may comprise a rear housing 172. The one or more yokes 116 may define a boundary between the portion 112 and the rear housing 172.

Figure 8:
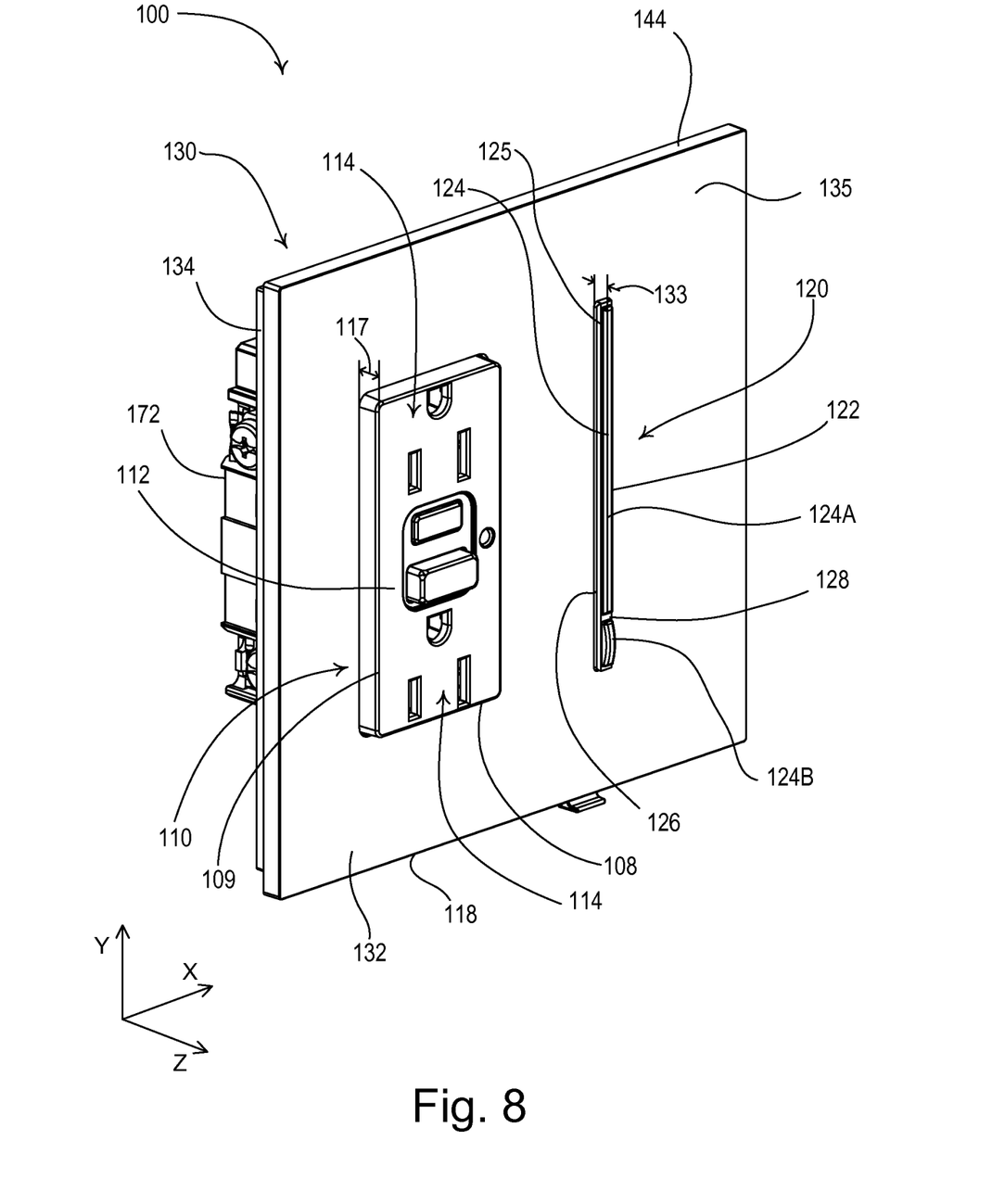
FIG. 8 is an isometric view of an example multi-gang installation with a plurality of wall-mounted electrical devices.
Figure 9A:
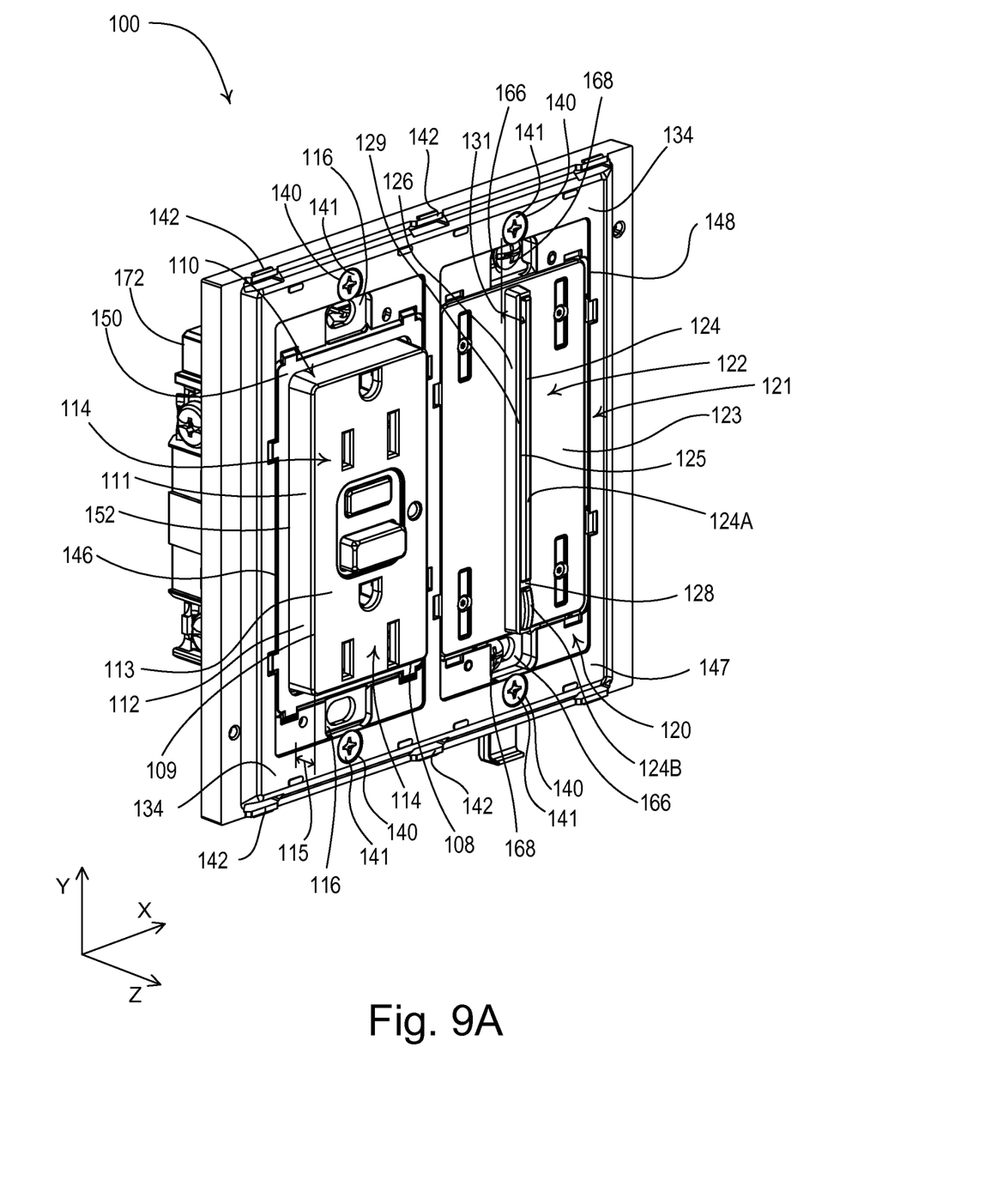
FIG. 9A is an isometric view of an example multi-gang installation with a faceplate of a faceplate assembly removed.
Figure 9B:
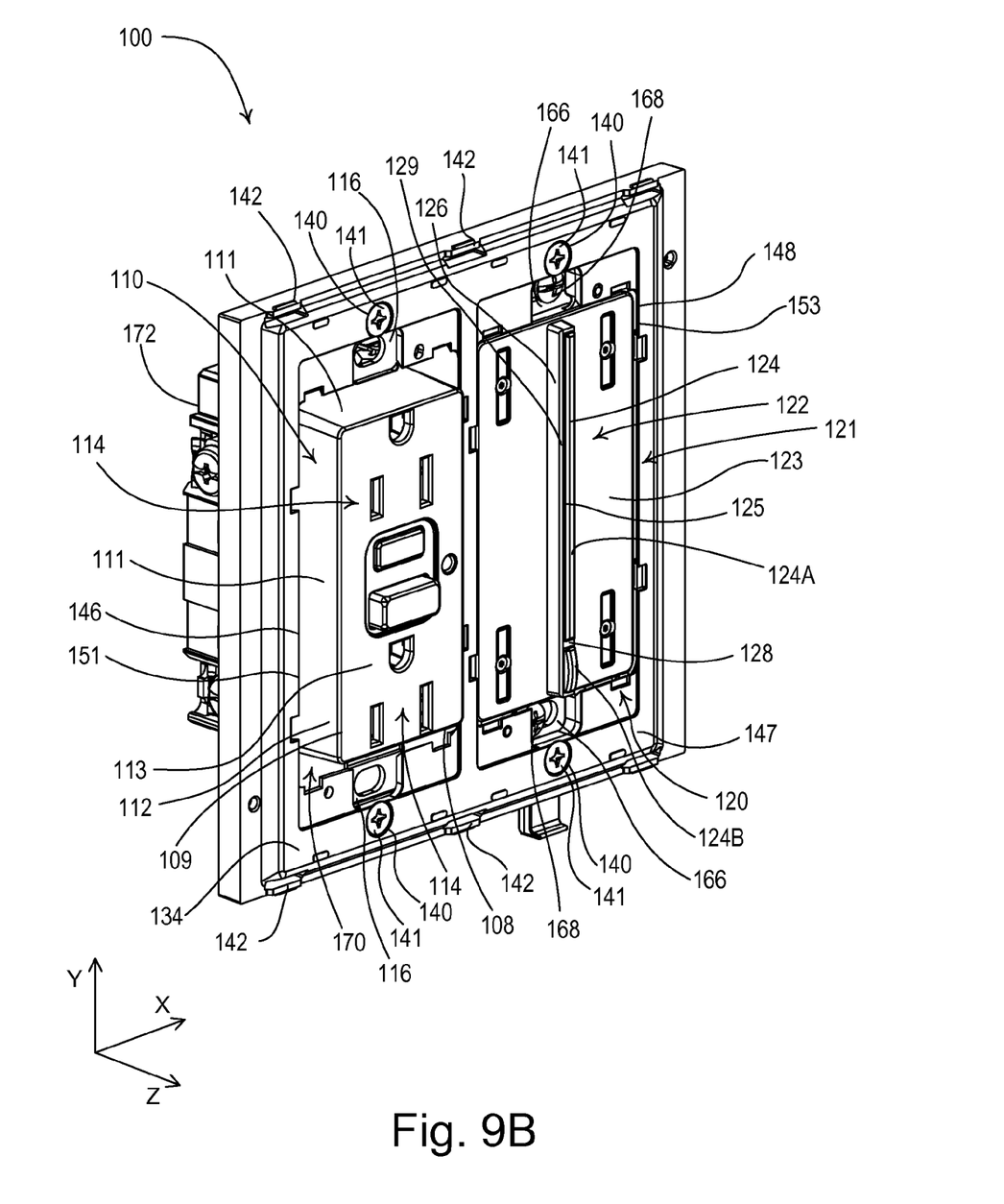
FIG. 9B is an isometric view of an example multi-gang installation with a faceplate and an insert element of a faceplate assembly removed.

An example load control device 120 may be illustrated in FIG. 8 and FIG. 9A-9B. The load control device 120 may be coupled in series electrical connection between the AC power source and an electrical load (e.g., a lighting load) for controlling the power delivered from the AC source to the electrical load. The electrical outlet 110 and the load control device 120 may be mounted in a standard multi-gang (e.g., two-gang) electrical wallbox (not shown).

The load control device 120 may comprise a user interface (e.g., such as the thin touch sensitive actuator 122). The load control device 120 may comprise a portion 121, as shown in FIG. 13B. The portion 121 may define, for example, a bezel, a protrusion, a front housing, and/or a user interface of the load control device 120. The portion 121 may form a part of the user interface. The load control device 120 may comprise a rear housing 171. The yoke 166 of the load control device 120 may define a boundary between the portion 121 and the rear housing 171. For example, the portion 121 may comprise one or more components in front of the yoke 166 and/or the rear housing 171 may comprise one or more components behind the yoke 166. The user interface of the load control device 120 may comprise an actuator, such as the thin touch sensitive actuator 122. The portion 121 may comprise a flat planar portion 123. The thin touch sensitive actuator 122 may be horizontally oriented along a longitudinal axis of the load control device 120. The thin touch sensitive actuator 122 may comprise an actuation member 124 having an upper portion 124A and a lower portion 124B. The actuation member 124 may extend through an opening 125 in a front surface 129 of the portion 126 of the load control device 120. The actuation member 124 may contact a touch sensitive device, such as a resistive touch pad (not shown), inside the load control device 120. The load control device 120 may control the intensity of the controlled lighting load via the touch sensitive device. For example, the intensity of the controlled lighting load may be controlled in response to actuations of the actuation member 124. The portion 126 may comprise a break 128, which separates the upper portion 124A and the lower portion 124B of the actuation member 124. Actuation of the lower portion 124B of the actuation member 124 may cause the load control device 120 to toggle the connected lighting load between on and off. Actuation of the upper portion 124A of the actuation member 124 (e.g., above the break 128) may cause the load control device 120 to adjust the intensity of the lighting load. For example, the intensity of the lighting load may be adjusted to a level corresponding to a position of the actuation along the length of the actuation member 124. The load control device 120 may comprise one or more yokes 166, which for example, may be located along the top and bottom surface of the load control device 120. The one or more yokes 166 of the load control device 120 may be configured to accept a wallbox screw 168 for securing the load control device 120 to a wallbox (not shown).

The load control device 120 may comprise an antenna (not shown). The antenna may be configured to transmit and/or receive radio-frequency (RF) signals. The antenna may enable remote control of the lighting load controlled by the load control device 120. The antenna may be housed within the portion 126. The portion 126 of the load control device 120 may be sized to accommodate the dimensions of the antenna. The perimeter of wall-mounted electrical devices may vary. For example, the perimeter of the load control device 120 may be greater than the perimeter of the portion 112 of the electrical outlet 110 (e.g., in any direction).

The multi-gang faceplate assembly 130 may comprise a faceplate 132, an adapter plate 134, and/or an insert element 150. The faceplate 132 may comprise a front surface 135, a bottom edge 118, a left edge 119, a right edge, 137, and a top edge 139. The faceplate 132 may be made of a non-conductive material (e.g., a plastic) and/or a conductive material (e.g., a metallic material). The faceplate assembly 130 may define a coordinate system (e.g., as shown in FIG. 1). The coordinate system may comprise an X axis, a Y axis, and a Z axis. The X axis, the Y axis, and the Z axis may be perpendicular to each other. The X axis may extend (e.g., horizontally) along the bottom edge 118 of the faceplate 132. The X axis may define an X direction. A bottom edge 108 of the portion 112 of the electrical outlet 110 may be parallel to the bottom edge 118 of the faceplate 132. The Y axis may extend (e.g., vertically) along the left edge 119 of the faceplate 132. The Y axis may define a Y direction. A left edge 109 of the portion of the electrical outlet 110 may be parallel to the left edge 119 of the faceplate 132. The Z axis may extend along a direction of assembly of the faceplate assembly 130. The Z axis may define a Z direction.

The faceplate may comprise an integral, inward-extending flange 144. The flange 144 may extend perpendicular to the front surface 135 and along the Z axis. The flange 144 may define a perimeter of the faceplate 132. When the multi-gang faceplate assembly 130 is assembled, the flange 144 may cover at least a part of a perimeter of the adapter plate 134. An interior face of the flange 144 may comprise a plurality of protrusions (not shown). The plurality of protrusions may comprise a generally triangular cross section. The faceplate 132 may be configured to be removably attached to the adapter plate 134.

The faceplate 132 may comprise one or more openings that permit portions of the wall-mounted electrical devices to protrude through the faceplate 132. For example, the faceplate 132 may comprise a first opening 136 and a second opening 138. The first opening 136 and the second opening 138 may be configured to receive wall-mounted electrical devices of different sizes. For example, a portion 112 of the electrical outlet 110 may extend through the first opening 136 and a portion 126 of the load control device 120 may extend through the second opening 138. The portion 112 of the electrical outlet 110 may occupy the first opening 136. The portion 126 may occupy the second opening 138. The first and second openings 136, 138 may have different dimensions. For example, the first opening 136 may be sized according to a standard faceplate opening size (e.g., a designer-style opening). Per standards set by the National Electrical Manufacturers Association (NEMA), the opening of a designer-style faceplate may have a length of approximately 2.630 inches and a width of approximately 1.310 inches (NEMA Standards Publication No. WD6, 2001, p. 5). The second opening 138 may be a non-standard opening size (e.g., to accommodate the thin touch sensitive actuator 122 of the load control device 120). For example, the second opening 138 may have a length of approximately 2.83 inches and a width of approximately 0.17 inches, such that the second opening 138 has an aspect ratio of approximately 16:1. The first and second openings 136, 138 may be sized and shaped to correspond to any number and/or any combination of wall-mounted electrical devices.

The adapter plate 134 may be defined by a generally flat plate with one or more openings. The adapter plate 134 may comprise a front surface 147, an inner edge 151, an inner edge 153, a plurality of screw holes 140, a plurality of snap tabs 142, a plurality of notches 149, and/or a plurality of snaps 158. The adapter plate 134 may be made of a non-conductive material (e.g., a plastic). The adapter plate 134 may be configured to be attached to one or more wall-mounted electrical devices, such as the electrical outlet 110, the load control device 120, and/or the like.

The adapter plate 134 may define one or more openings. For example, the adapter plate 134 may define a first opening 146 and a second opening 148. The inner edge 151 of the adapter plate 134 may define the first opening 146, and the inner edge 153 of the adapter plate 134 may define the second opening 148. The inner edge 151 may be substantially the same size and shape as the inner edge 153. The first opening 146 of the adapter plate 134 may align with the first opening 136 of the faceplate 132. The second opening 148 of the adapter plate 134 may align with the second opening 138 of the faceplate 132. The dimensions of the first and second openings 146, 148 of the adapter plate 134 may be substantially equivalent. For example, the first opening 146 and the second opening 148 of the adapter plate 134 may be the same size, such that the adapter plate 134 can be used independent of what electrical devices and/or faceplate is installed with the adapter plate, and/or independent of the specific orientation of the electrical devices. The dimensions of the first and second openings 146, 148 of the adapter plate 134 may be the larger than the dimensions of the first and second openings 136, 138 of the faceplate 132.

The adapter plate 134 may be secured to one or more wall-mounted electrical devices. For example, the adapter plate 134 may comprise the plurality of screw holes 140 through which a plurality of adapter plate screws (e.g., adapter plate screws 141, as shown in FIGS. 9A and 9B) may be received to attach (e.g., mechanically connect) the adapter plate 134 to the yokes 116, 166 of the one or more wall-mounted electrical devices (e.g., such as electrical outlet 110 and the load control device 120).

The first opening 146 and the second opening 148 of the adapter plate may comprise the plurality of notches 149. Each of the notches 149 may be defined by one of the inner edges 151, 153. The plurality of notches 149 may be configured to enable the one or more wall-mounted electrical devices to be secured (e.g., mounted to) a wallbox (not shown). For example, the plurality of notches 149 may allow for space for a screw to secure a wall-mounted electrical device to a wallbox when the adapter plate 134 is attached to the wall-mounted electrical device.

The adapter plate 134 may comprise the plurality of snap tabs 142 around a raised periphery of the adapter plate 134. The plurality of snap tabs 142 may be configured to snap to the plurality of protrusions (not shown) on top and bottom side walls of the faceplate 132, such that the faceplate 132 may be removably attached to the adapter plate 134. Examples of snap mechanisms for attaching the faceplate 132 to the adapter plate 134 are described in greater detail in commonly-assigned U.S. Pat. No. 4,924,349, issued May 8, 1990, entitled FACE PLATE ASSEMBLY FOR ELECTRICAL DEVICES, the entire disclosure of which is hereby incorporated by reference.

Figures 2, 4, 5, 6:
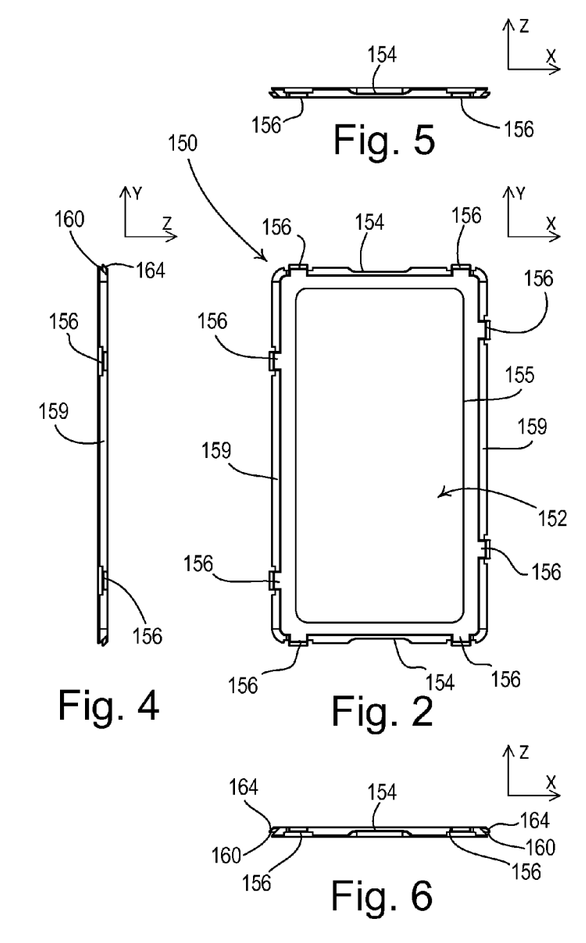
FIG. 2 is a front view of an example insert element.
FIG. 4 is a left side view of the example insert element of FIG. 2.
FIG. 5 is a top view of the example insert element of FIG. 2.
FIG. 6 is a bottom view of the example insert element of FIG. 2.
Figure 3:
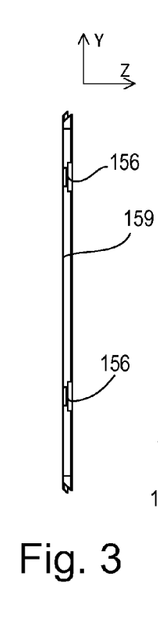
FIG. 3 is a right side view of the example insert element of FIG. 2.
Figure 7:
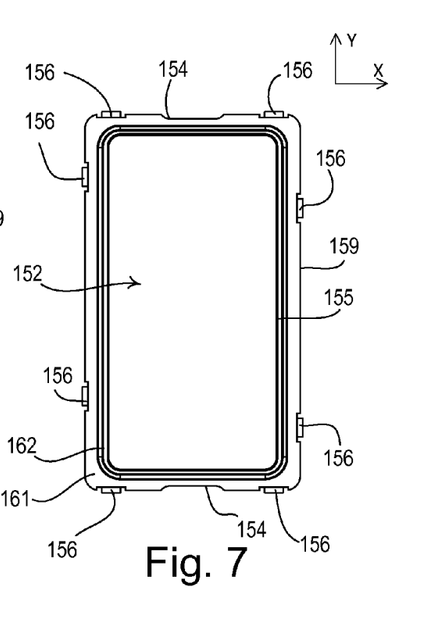
FIG. 7 is a rear view of the example insert element of FIG. 2.

FIG. 2 is a front view of the example insert element 150. FIGS. 3-7 are projection views of the example insert element 150. FIG. 3 is a right side view of the example insert element 150. FIG. 4 is a left side view of the example insert element 150. FIG. 5 is a top view of the example insert element 150. FIG. 6 is a bottom view of the example insert element 150. FIG. 7 is a rear view of the example insert element 150. The insert element 150 may be made of a non-conductive material (e.g., such as plastic). The insert element 150 may be configured to be removably attached to the adapter plate 134.

The insert element 150 may comprise an inner edge 155, an outer flange 159 (e.g., outwardly sloping walls), a rear surface 161, a plurality of snaps 156, one or more cutouts 154, and/or a raised edge 162. The inner edge 155 of the insert element 150 may define an opening 152. The opening 152 may be configured to permit a portion of a wall-mounted electrical device (e.g., such as, the portion 112 of the electrical outlet 110) to protrude through (e.g., extend through) the opening 152 of the insert element 150. The opening 152 of the insert element 150 may be configured to align with the first opening 146 and/or the second opening 148 of the adapter plate 134. The opening 152 of the insert element 150 may be sized based on at least one of the portion of the wall-mounted electrical device or a user interface of a load control device. The inner edge 155 of the insert element 150 may be smaller than the inner edges 151, 153 of the adapter plate 134.

The insert element 150 may be configured to be secured to a rear surface of the adapter plate 134. The outer flange 159 may be configured to rest within (e.g., engage) a cavity on a rear surface of an adapter plate 134, for example, when the insert element 150 is secured to the adapter plate 134. The outer flange 159 may be configured such that the insert element 150 is prevented from being removed via the front surface 147 of the adapter plate 134.

The plurality of snaps 156 may be arranged around a periphery of the insert element 150. For example, the each peripheral side of the insert element 150 may include two of the plurality of snaps 156. The plurality of snaps 156 may comprise sloped surfaces 164. The plurality of snaps 156 may be configured to be demountably engaged with the plurality of corresponding snaps 158 of the adapter plate 134. The plurality of snaps 156 may be configured such that the insert element 150 is secured to the adapter plate 134. The plurality of snaps 156 may be configured to hinder the removal (e.g., prevent removal without the use of a tool) of the insert element 150 when the insert element 150 is secured to the adapter plate 134.

The rear surface 161 of the insert element 150 may include the raised edge 162 (e.g., such as a collar). The raised edge 162 may extend around the periphery (e.g., inner edge 155) of the opening 152 of the insert element 150. The raised edge 162 may be configured to receive and secure a wall-mounted electrical device. The insert element 150 may comprise the one or more cutouts 154, for example, such that one or more mounting screws (e.g., such as a wallbox screw 168) of the electrical outlet 110 can be accessed when the insert element 150 is installed.

FIG. 8 is an isometric view of an example multi-gang installation 100 with a plurality of wall-mounted electrical devices. FIG. 9A is an isometric view of the example multi-gang installation 100 with the faceplate 132 of the example faceplate assembly 130 removed. FIG. 9B is an isometric view of the example multi-gang installation 100 with the faceplate 132 and the insert element 150 of the example faceplate assembly 130 removed.

The adapter plate 134 may be configured to be attached to the plurality of wall-mounted electrical devices (e.g., such as electrical outlet 110 and the load control device 120). For example, one or more adapter plate screws 141 may secure the adapter plate 134 to the wall-mounted electrical devices 110, 120. The adapter plate screws 141 may be received through the screw holes 140 to attach (e.g., mechanically connect) the adapter plate 134 to the yokes 116, 166 of the wall-mounted electrical devices 110, 120.

When the adapter plate 134 is connected, a portion (e.g., such as the portion 112 or the portion 126) of the wall-mounted devices may extend through the openings 146, 148 of the adapter plate 134. For example, the front surface 113 of the portion 112 of the electrical outlet 110 may protrude through the first opening 146 of the adapter plate 134, and the front surface 129 of the portion 126 of the load control device 120 may protrude through the second opening 148 of the adapter plate 134. The portion 112 of the electrical outlet 110 may occupy the first opening 146 of the adapter plate 134. The portion 121 of the load control device 120 may occupy the second opening 148 of the adapter plate 134. For example, the flat planar portion 123 may occupy the second opening 148 of the adapter plate 134. The touch sensitive actuator 122 of the load control device 120 may extend a first distance 131 past the front surface 147 of the adapter plate 134 (e.g., as shown in FIG. 9A). The front surface 113 of the portion 112 of the electrical outlet 110 may extend a second distance 115 past the front surface 147 of the adapter plate 134 (e.g., as shown in FIG. 9A). The touch sensitive actuator 122 may extend farther past the front surface 147 of the adapter plate 134 than the front surface 113 of the portion 112. For example, the first distance 131 may be greater than the second distance 115.

The faceplate 132 may be configured to be attached to the adapter plate 134. The adapter plate 134 may engage a rear surface of the faceplate 132. The snap tabs 142 of the adapter plate 134 may be configured to engage the plurality of corresponding cavities or tabs (not shown) on the back of the faceplate 132. The plurality of snap tabs 142 of the adapter plate 134 and the plurality of corresponding cavities or tabs of the faceplate 132 may be configured such that the faceplate 132 can be removably attached to the adapter plate. The openings 148, 148 of the adapter plate 134 may align with the openings 136, 138 of the faceplate 132. When installed, the front surface 147 of the adapter plate 134 may be proximate to the faceplate 132.

When the faceplate 132 is attached to the adapter plate 134, the portions of the wall-mounted devices may extend through the openings 136, 138 of the faceplate 132. For example, the front surface 113 of the portion 112 of the electrical outlet 110 may protrude through the opening 136 of the faceplate 132, and the front surface 129 of the portion 126 of the load control device 120 may protrude through the opening 138 of the faceplate 132. The front surface 129 of the portion 126 of the load control device 120 may extend a third distance 133 past the front surface 135 of the faceplate 132 (e.g., as shown in FIG. 8). The front surface 113 of the portion 112 of the electrical outlet 110 may extend a fourth distance 117 past the front surface 135 of the faceplate 132 (e.g., as shown in FIG. 8). The touch sensitive actuator 122 may extend farther past the front surface 135 of the faceplate 132 than the front surface 113 of the portion 112, for example, to increase the amount of fine tune adjustment of the intensity of the controlled lighting load that may be possible in response to actuations of the touch sensitive actuator 122. For example, the third distance 133 may be greater than the fourth distance 117.

The first distance 131, the second distance 115, the third distance 133, and the fourth distance 117 may be measured in the Z direction (e.g., as defined by the Z axis). The first distance 131 may define a first portion of the portion 126, and the third distance 133 may define a second portion of the portion 126. The first portion of the portion 126 may comprise the second portion. The second distance 115 may define the first portion of the portion 112, and the fourth distance 117 may define the second portion of the portion 112. The first portion of the portion 112 may comprise the second portion.

The adapter plate 134 may be configured to receive one or more insert elements 150. For example, the faceplate assembly 130 may comprise as many insert elements 150 as there are openings defined by the adapter plate 134. The insert element 150 may be configured to be received in the first opening 146 of the adapter plate 134 (e.g., as shown in FIG. 9A), and/or received in the second opening 148 of the adapter plate 134. The insert element 150 may be configured to be removably attached to the adapter plate 134. For example, the flange 159 of the insert element 150 may be accepted by a cavity of the adapter plate 134, and the plurality of snaps 156 may be configured to be demountably engaged with the plurality of corresponding snaps 158 of the adapter plate 134. The opening 152 of the insert element 150 may be configured to align with the first opening 146 and/or the second opening 148 of the adapter plate 134. The opening 152 of the insert element 150 may be sized based on at least a portion of the wall-mounted electrical device or a user interface of a load control device.

When the insert element 150 is not installed, a gap 170 may be present between the outer surface of a wall-mounted electrical device and the inner edge 151 of the adapter plate 134. For example, when the insert element 150 is not installed, a gap 170 may be present between the outer surface 111 of the portion 112 of the electrical outlet 110 and the inner edge 151 of the adapter plate 134 (e.g., as shown in FIG. 9B). The gap 170 may be a peripheral gap such that the gap 170 extends around the periphery of the portion 112 of the electrical outlet 110. However, a similar gap may not be present between an outer surface of the load control device 120 and the inner edge 151 of the adapter plate 134. For example, the portion 126 of the load control device 120 may be sized and shaped similar to the openings 146, 148 of the adapter plate 134. As such, the load control device 120 and the inner edge 153 of the adapter plate 134 substantially correspond such that little space exists between them. However, other wall-mounted electrical devices, such as the electrical outlet 110, may not be sized and shaped similar to the openings 146, 148 of the adapter plate 134, such that when the insert element 150 is not installed, the gap 170 may be present.

Figure 10:
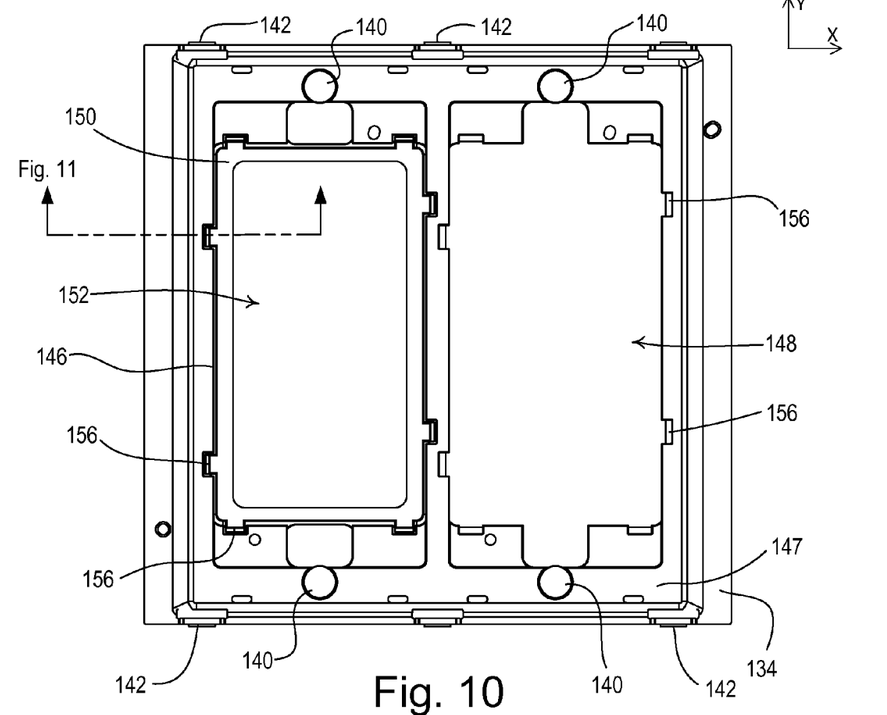
FIG. 10 is a front view of an example adapter plate with an example insert element installed in a first opening of the adapter plate.
Figure 11:
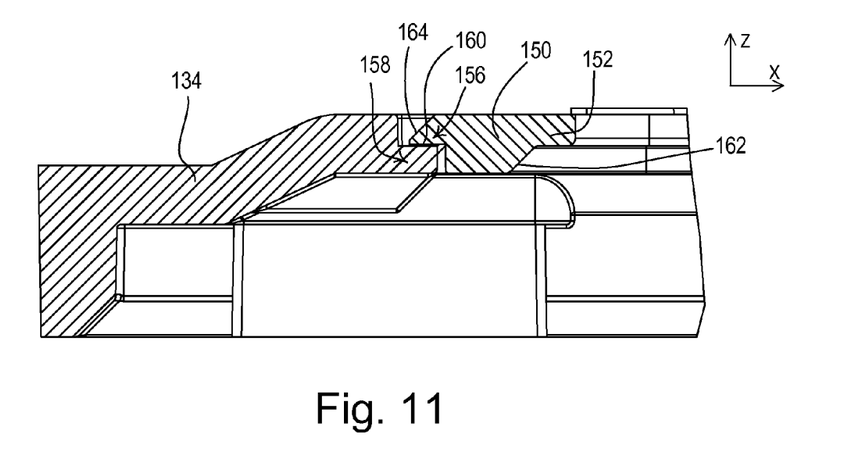
FIG. 11 is an enlarged partial cross-sectional view of the example adapter plate and insert element of FIG. 10.

FIG. 10 is a front view of the example adapter plate 134 with the example insert element 150 installed in the first opening 146 of the adapter plate 134. The insert element 150 may comprise the plurality of snaps 156 (e.g., eight snaps) surrounding the periphery of the insert element 150. The plurality of snaps 156 may be configured to be mechanically coupled to corresponding snaps 158 of the adapter plate 134. The corresponding snaps 158 of the adapter plate 134 may surround the first opening 146 and/or the second opening 148 of the adapter plate 134. The plurality of snaps 156 and the corresponding snaps 158 may be configured to secure the insert element 150 to the adapter plate 134. For example, the insert element 150 may be secured within the first opening 146 of the adapter plate 134, as shown in FIGS. 10 and 11. The insert element 150 may be configured to be secured to a rear surface of the adapter plate 134. For example, when secured, the insert element 150 may be configured to prevent removal (e.g., without the use of a tool) via the front surface 147 of the adapter plate 134.

FIG. 11 is an enlarged partial cross-sectional view of the example adapter plate 134 with the insert element 150 installed. Each of the plurality of snaps 156 on the insert element 150 may comprise a flat surface 160. When installed on the adapter plate 134, the flat surface 160 may be oriented in a plane parallel to the front surface 135 of the faceplate 132 (not shown) installed on the adapter plate 134 (e.g., the X-Y plane). The flat surface 160 of each of the plurality of snaps 156 may be configured to rest against a corresponding flat surface 162 of a corresponding snap 158 on the adapter plate 134. The corresponding flat surface 162 of each of the plurality of corresponding snaps 158 on the adapter plate 134 may be oriented in the plane parallel to the front surface 135 of the faceplate 132 (e.g., the X-Y plane). The plurality of snaps 156 and the plurality of corresponding snaps 158 may be configured to hinder removal (e.g., prevent removal without the use of a tool) of the insert element 150 when the insert element 150 is installed. The plurality of snaps 156 of the insert element 150 may include a sloped surface 164. The sloped surface 164 of each of the plurality of snaps 156 may enable installation (e.g., facilitate insertion) of the insert element 150 into the first opening 146 or the second opening 148 of the adapter plate 134.

Figure 12:
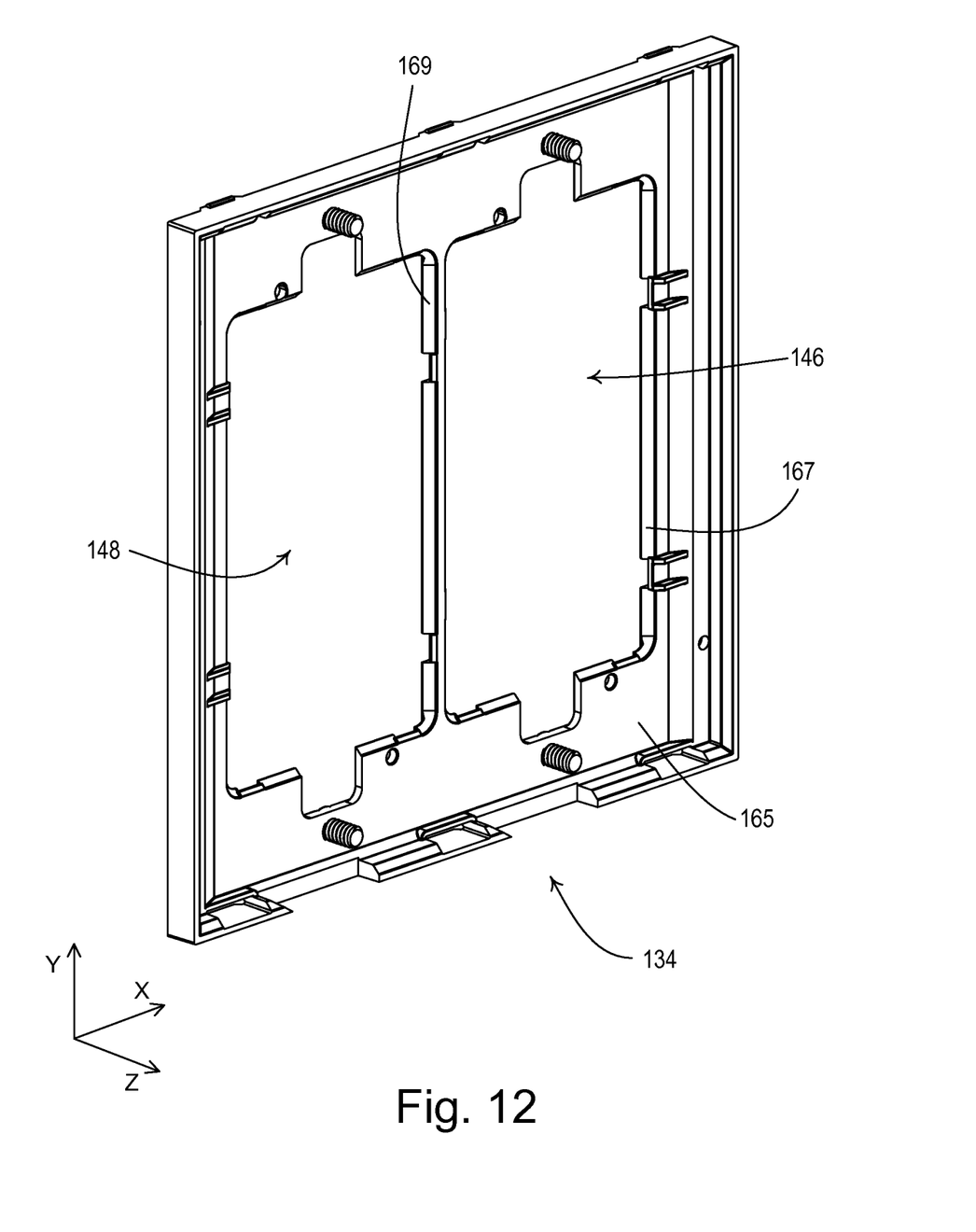
FIG. 12 is an isometric view of the example adapter plate 134 showing a rear surface 165 of the adapter plate 134.

FIG. 12 is an isometric view of the example adapter plate 134 showing a rear surface 165 of the adapter plate 134. The rear surface 165 may comprise a first cavity 167 (e.g., a chamfered or beveled edge) that surrounds the first opening 146 of the adapter plate 134. The rear surface 165 may comprise a second cavity 169 (e.g., a chamfered or beveled edge) that surrounds the second opening 148 of the adapter plate 134. The first cavity 167 and/or the second cavity 169 may be configured to accept the flange 159 of the insert element 150. The first cavity 167 and/or the second cavity 169 may be configured to prevent the removal (e.g., prevent removal without the use of a tool) of the insert element 150, when installed, via the front surface 147 of the adapter plate 134 that is proximate to the faceplate 132.

Figure 13:
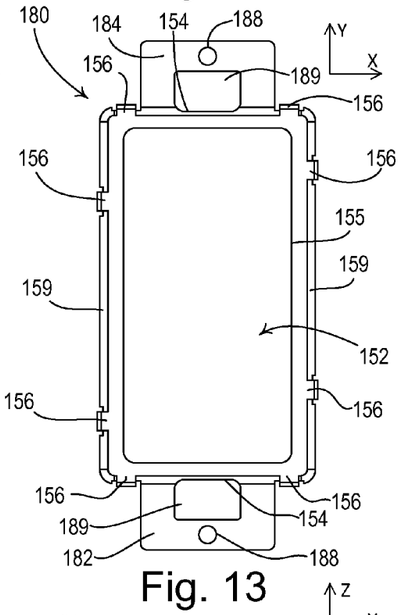
FIG. 13 is a front view of an example insert element.
Figure 14:
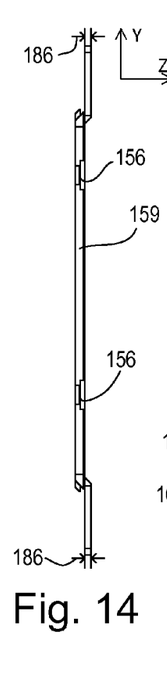
FIG. 14 is a right side view of the example insert element of FIG. 13.
Figure 15:
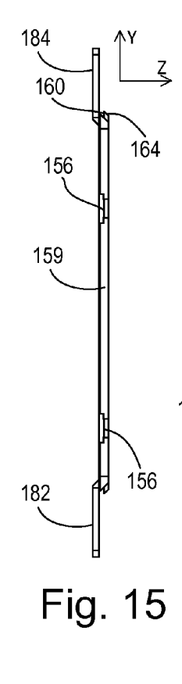
FIG. 15 is a left side view of the example insert element of FIG. 13.
Figure 16:
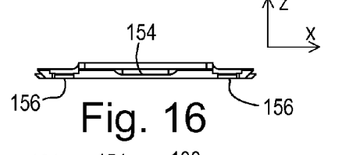
FIG. 16 is a top view of the example insert element of FIG. 13.
Figure 17:
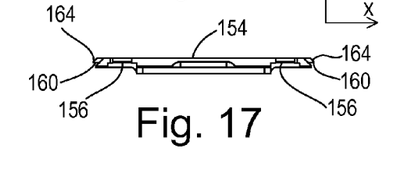
FIG. 17 is a bottom view of the example insert element of FIG. 13.
Figure 18:
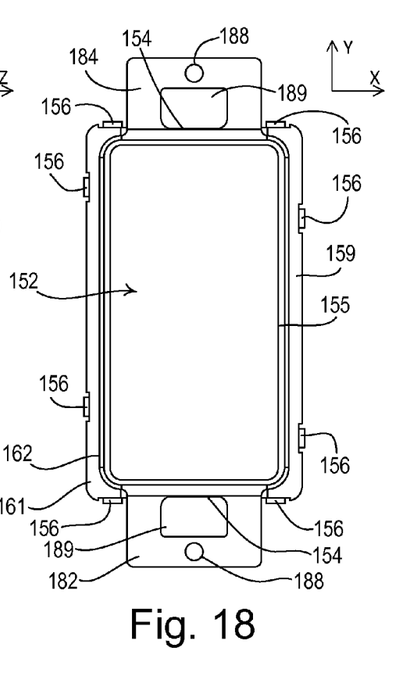
FIG. 18 is a rear view of the example insert element of FIG. 13.

FIG. 13 is a front view of an example insert element 180. FIGS. 14-18 are projection views of the example insert element 180. FIG. 14 is a right side view of the example insert element 180. FIG. 15 is a left side view of the example insert element 180. FIG. 16 is a top view of the example insert element 180. FIG. 17 is a bottom view of the example insert element 180. FIG. 18 is a rear view of the example insert element 180. The faceplate assembly 130 may comprise the insert element 180 (e.g., in addition to or in lieu of the insert element 150). The insert element 180 may be an example of the insert element 150. For example, the insert element 180 may further comprise a top spacer 182 and a bottom spacer 184. The top spacer 182 and the bottom spacer 184 may be configured to locate the wall-mounted electrical device (e.g., such as the electrical outlet 110) in the Z direction. The top spacer 182 and the bottom spacer 184 of the insert element 180 may comprise a thickness 186. The thickness 186 may be measured in the Z direction. The top spacer 182 and the bottom spacer 184 of the insert element 180 may comprise one or more screw holes 188. The one or more screw holes 188 may be configured to accept an adapter plate screw (e.g., such as the adapter plate screw 141). The top spacer 182 and the bottom spacer 184 of the insert element 180 may comprise a cutout 189. The cutout 189 may define the cutout 154. The cutout 189 may be configured to allow access to a wallbox screw (e.g., such as the wallbox screw 168).

Figure 19:
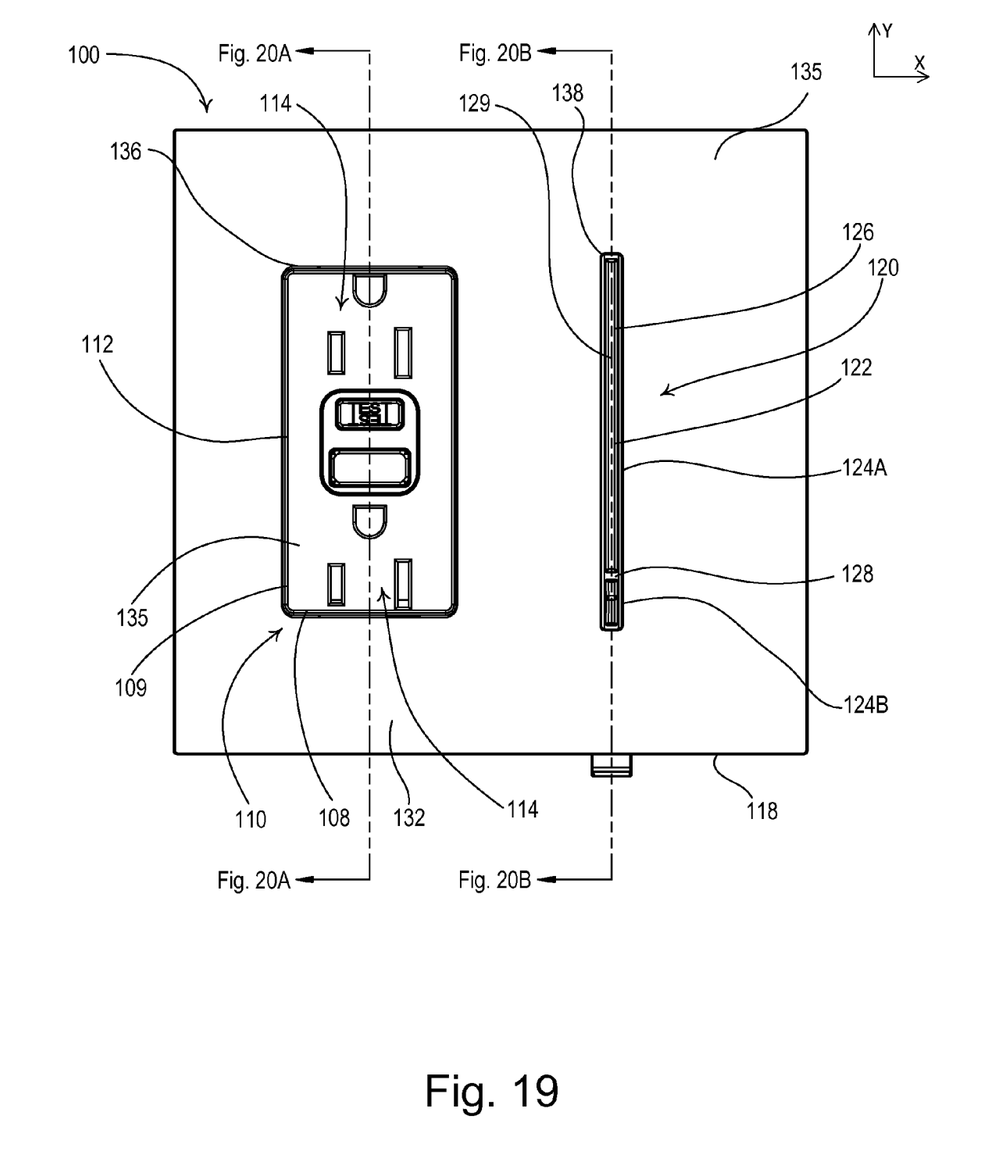
FIG. 19 is a front view of an example multi-gang installation.

FIG. 19 is a front view of the example multi-gang installation 100 that comprises the example faceplate assembly 130. The portion 112 of the electrical outlet 110 may extend through the first opening 136 of the faceplate 132 and the portion 126 of the load control device 120 may extend through the second opening 138 of the faceplate. The portion 112 of the electrical outlet 110 may comprise a front surface 135. The portion 126 of the load control device 120 may comprise a front surface 129. The faceplate assembly 130 may be configured to locate a wall-mounted electrical device (e.g., such as the electrical outlet 110 and/or the load control device 120) in the X direction and the Y direction.

Figures 20A, 20B:
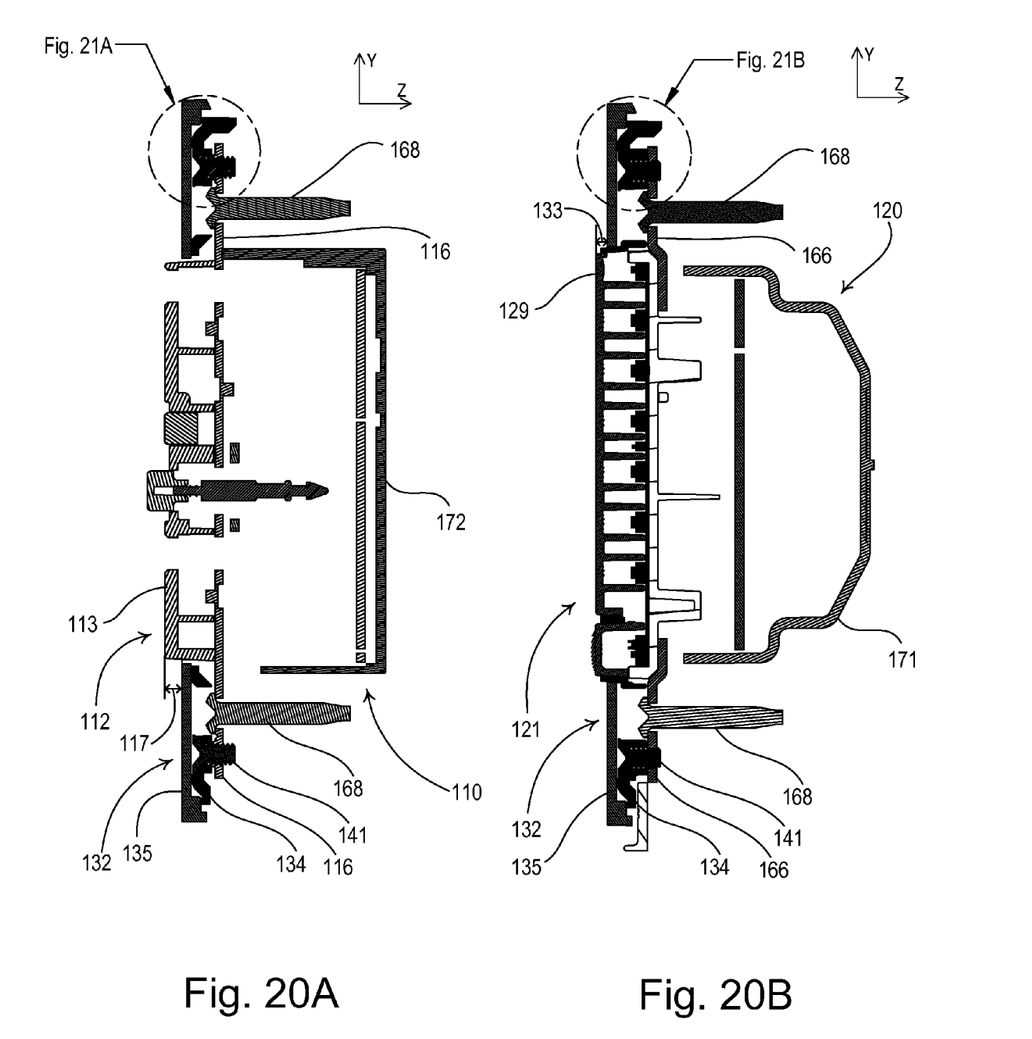
FIG. 20A is a cross-sectional view of an example electrical outlet secured to a faceplate assembly in the example multi-gang installation.
FIG. 20B is a cross-sectional view of an example load control device secured to a faceplate assembly in the example multi-gang installation.

FIGS. 20A and 20B are cross-sectional views of the example multi-gang installation 100 that comprises the example faceplate assembly 130. The example faceplate assembly 130 may be configured to locate the wall-mounted electrical device (e.g., such as the electrical outlet 110 and/or the load control device 120) in the Z direction. The insert element 180 may be configured to locate the wall-mounted electrical device in the Z direction. For example, the Z direction thickness of the insert element 180 may locate the wall-mounted electrical device in the Z direction. The insert element 180 may be configured to adjust a distance that a front surface of a portion of the wall-mounted electrical device (e.g., such as the front surface 113 of the portion 112 of the electrical outlet 110) extends beyond a front surface of the faceplate. For example, the insert element 180 may be configured such that the front surface 113 of the portion 112 of the electrical outlet 110 extends a fourth distance 117 past the front surface 135 of the faceplate 132 (e.g., as shown in FIG. 20A). The fourth distance 117 may be zero such that the front surface 113 of the portion 112 is flush (e.g., substantially flush) with the front surface 135 of the faceplate 132). The front surface 129 of the portion 126 of the load control device 120 may extend the third distance 133 past the front surface 135 of the faceplate 132 (e.g., as shown in FIG. 20B). The third distance 133 and the fourth distance 117 may be substantially similar.

Figure 21A:
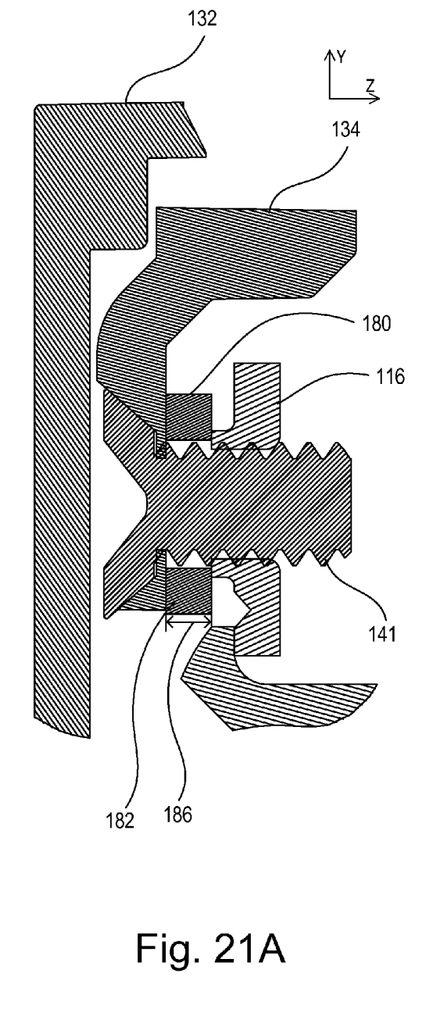
FIG. 21A is an enlarged section view of the cross-sectional view of the example electrical outlet secured to the faceplate assembly in the example multi-gang installation of FIG. 20A.
Figure 21B:
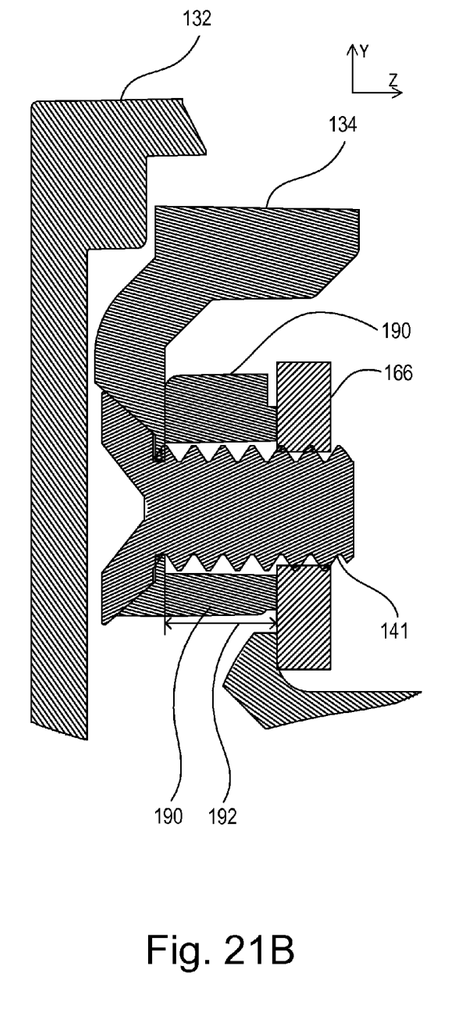
FIG. 21B is an enlarged section view of the cross-sectional view of the example load control device secured to the faceplate assembly in the example multi-gang installation of FIG. 20B.

FIGS. 21A and 21B are section views of the cross-sectional views of the example multi-gang installation 100 that comprises an example faceplate assembly 130. The insert element 180 may adjust a Z direction spacing between the adapter plate 134 and a yoke 116 of the electrical outlet 110. For example, the insert element 180 may be configured to adjust a depth of engagement of the adapter plate screws 141 engaging the yoke 116 of the electrical outlet 110. The top spacer 182 and the bottom spacer 184 of the insert element 180 may comprise a thickness 186 in the Z direction. The insert element 180 may locate the electrical outlet 110 in the Z direction such that the thickness 186 of the top spacer 182 and the bottom spacer 184 adjusts the second distance 115 (e.g., as shown in FIG. 9A) between the front surface 147 of the adapter plate 134 and the front surface 113 of the portion 112 of the electrical outlet 110. The load control device 120 may comprise an integral spacer 190 (e.g., since the load control device 120 is not installed with the insert element 180). The integral spacer 190 of the load control device 120 may comprise a second thickness 192 in the Z direction. The integral spacer 190 of the load control device 120 may be configured to locate the load control device 120 in the Z direction. For example, the thickness 186 of the top and bottom spacers 182, 184 of the insert element 180 may be configured such that the fourth distance 117 is substantially zero and/or substantially equal to the third distance 133 (e.g., when the load control device 120 comprises the integral spacer 190, and when not).

What is claimed is:

1. A faceplate assembly for a wall-mounted electrical device, the faceplate assembly comprising:
   an adapter plate configured to be attached to the wall-mounted electrical device, the adapter plate defining a first opening that is configured to permit a front surface of a portion of the wall-mounted electrical device to protrude through the adapter plate;
   a faceplate configured to be removably attached to the adapter plate, the faceplate defining a second opening that is configured to permit the front surface of the portion of the wall-mounted electrical device to protrude through the faceplate; and
   an insert element configured to be removably attached to the adapter plate, the insert element defining a third opening that is configured to permit the front surface of the portion of the wall-mounted electrical device to protrude through the insert element, and the insert element configured to adjust a distance that the front surface of the portion of the wall-mounted electrical device extends beyond a front surface of the faceplate.

2. The faceplate assembly of claim 1, wherein the insert element comprises a top spacer and a bottom spacer that have a thickness, wherein the distance that the front surface of the portion of the wall-mounted electrical device extends beyond a front surface of the faceplate is based on the thickness of the top spacer and the bottom spacer.

3. The faceplate assembly of claim 1, wherein the insert element is configured such that, when installed, the front surface of the portion of the wall-mounted electrical device is substantially flush with the front surface of the faceplate.

4. The faceplate assembly of claim 1, wherein the adapter plate comprises a plurality of first snaps surrounding the first opening, and wherein the insert element comprises a plurality of second snaps surrounding a periphery of the insert element, the plurality of second snaps of the insert element configured to be demountably engaged with the plurality of first snaps of the adapter plate to secure the insert element to the adapter plate.

5. The faceplate assembly of claim 4, wherein the plurality of first and second snaps are configured to hinder the removal of the insert element when the insert element is secured to the adapter plate, and wherein the plurality of first and second snaps comprise sloped surfaces.

6. The faceplate assembly of claim 1, wherein the insert element is configured to occupy a peripheral gap between an inner edge of the adapter plate and an outer surface of the portion of the wall-mounted electrical device when the portion of the wall-mounted electrical device is within the first opening.

7. The faceplate assembly of claim 1, wherein a rear surface of the adapter plate comprises a cavity surrounding the first opening, and wherein the insert element comprises a flange that is configured to be accepted by a cavity of the adapter plate.

8. The faceplate assembly of claim 1, wherein the adapter plate is configured to align the wall-mounted electrical device within the first opening.

9. The faceplate assembly of claim 1, wherein the adapter plate, when the insert element is secured to the adapter plate, is configured to prevent the removal of the insert element via a front surface of the adapter plate that is proximate to the faceplate.

10. The faceplate assembly of claim 1, wherein the first opening permits a first portion of the wall-mounted electrical device to protrude through the adapter plate, the second opening permits a second portion of the wall-mounted electrical device to protrude through the faceplate, the first portion comprising the second portion, and wherein the third opening permits the second portion of the wall-mounted electrical device to protrude through the insert element.

11. A faceplate assembly for a plurality of wall-mounted electrical devices, the faceplate assembly comprising:
   a faceplate;
   an adapter plate configured to be attached to the plurality of wall-mounted electrical devices, the adapter plate defining a first opening configured to permit a front surface of a first portion of a first wall-mounted electrical device to protrude through the adapter plate, and defining a second opening configured to permit a front surface of a second portion of a second wall-mounted electrical device to protrude through the adapter plate; and an insert element configured to be removably attached to the adapter plate, the insert element defining a third opening that is configured to permit the front surface of the first portion or second portion of the first or second wall-mounted electrical device to protrude through the insert element, and the insert element being configured to adjust a distance that the front surface of the first portion or second portion protrudes beyond a front surface of the faceplate.

12. The faceplate assembly of claim 11, wherein the faceplate is configured to be removably attached to the adapter plate, the faceplate defining a fourth opening configured to permit the front surface of the first portion of the first wall-mounted electrical device to protrude through the faceplate, and the faceplate defining a fifth opening configured to permit the front surface of the second portion of the second wall-mounted electrical device to protrude through the faceplate.

13. The faceplate assembly of claim 12, wherein the adapter plate, when the insert element is secured to the adapter plate, is configured to prevent the removal of the insert element via a front surface of the adapter plate that is proximate to the faceplate.

14. The faceplate assembly of claim 11, wherein the insert element is a first insert element, the distance is a first distance, and the first insert element being configured such that the front surface of the first portion of the first wall-mounted electrical device protrudes the first distance through the adapter plate, the faceplate assembly further comprising a second insert element configured such that the front surface of the second portion of the second wall-mounted electrical device protrudes a second distance through the adapter plate.

15. The faceplate assembly of claim 14, wherein the first insert element is configured such that, when installed, the front surface of the first portion of the first wall-mounted electrical device is substantially flush with the front surface of a faceplate of the faceplate assembly.

16. The faceplate assembly of claim 11, wherein the adapter plate comprises a plurality of first snaps surrounding the first opening and a plurality of second snaps surrounding the second opening, and wherein the insert element comprises a plurality of third snaps surrounding a periphery of the insert element, the plurality of third snaps of the insert element configured to be demountably engaged with the plurality of first snaps or second snaps of the adapter plate to secure the insert element to the adapter plate.

17. The faceplate assembly of claim 16, wherein the plurality of first and second snaps of the adapter plate and the plurality of third snaps of the insert element are configured to hinder the removal of the insert element when the insert element is configured to be secured to the adapter plate, and wherein the plurality of first and second snaps of the adapter plate and the plurality of third snaps of the insert element comprise sloped surfaces.

18. The faceplate assembly of claim 11, wherein the insert element is configured to occupy a peripheral gap between an inner edge of the adapter plate and an outer surface of the first portion of the first wall-mounted electrical device of an outer surface of the second portion of the second wall-mounted electrical device when the first portion or the second portion of the first or second wall-mounted electrical device is within the first or second opening.

19. The faceplate assembly of claim 11, wherein a rear surface of the adapter plate comprises a first cavity and a second cavity, and wherein the first cavity surrounds the first opening and the second cavity surrounds the second opening, and wherein the insert element comprises a flange that is configured to be accepted by the first cavity or the second cavity.

20. A faceplate assembly for a wall-mounted electrical device, the electrical device defining an X-Y plane having an X direction and a Y direction, the faceplate assembly comprising:

a faceplate;

an adapter plate configured to be attached to the wall-mounted electrical device, the adapter plate configured to locate the wall-mounted electrical device in the X direction and the Y direction; and an insert element configured to be removably attached to the adapter plate, the insert element configured to occupy a peripheral gap between an inner edge of the adapter plate and an outer surface of the wall-mounted electrical device, and the insert element configured to adjust a distance that a front surface of a portion of the wall-mounted electrical device extends beyond a front surface of the faceplate.

21. The faceplate assembly of claim 20, wherein the faceplate is configured to be removably attached to the adapter plate, and wherein the faceplate defines a third opening that is configured to permit a front surface of a portion of the wall-mounted electrical device to protrude through the faceplate.

22. The faceplate assembly of claim 20, wherein the insert element comprises a top spacer and a bottom spacer that have a thickness, wherein the distance that the front surface of the portion of the wall-mounted electrical device extends beyond the front surface of the faceplate is based on the thickness of the top spacer and the bottom spacer.

23. The faceplate assembly of claim 20, wherein the adapter plate defines a first opening that is configured to permit a front surface of a portion of the wall-mounted electrical device to protrude through the adapter plate, and wherein a rear surface of the adapter plate comprises a cavity surrounding the first opening.

24. The faceplate assembly of claim 23, wherein the adapter plate comprises a plurality of first snaps surrounding the first opening, and wherein the insert element comprises a plurality of second snaps surrounding a periphery of the insert element, the plurality of second snaps of the insert element configured to be demountably engaged with the plurality of first snaps of the adapter plate to secure the insert element to the adapter plate.

25. The faceplate assembly of claim 20, wherein the insert element is configured to locate the wall-mounted electrical device in the X direction and the Y direction, and wherein the adapter plate and/or the insert element is configured to locate the wall-mounted electrical device in a Z direction that is perpendicular to the X-Y plane.

* * * * *